(12) United States Patent
Murrell et al.

(10) Patent No.: US 7,629,756 B2
(45) Date of Patent: Dec. 8, 2009

(54) METHOD AND APPARATUS FOR CONTROLLING ASYNCHRONOUS MOTORS

(75) Inventors: Terry Murrell, San Pedro, CA (US); Daniel L. Kowalewski, Redondo Beach, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 340 days.

(21) Appl. No.: 11/769,817

(22) Filed: Jun. 28, 2007

(65) Prior Publication Data
US 2009/0001906 A1    Jan. 1, 2009

(51) Int. Cl.
*H02P 5/00* (2006.01)
(52) U.S. Cl. .................. 318/254; 318/34; 318/66; 318/293; 318/494; 123/406.13
(58) Field of Classification Search .................. 318/34, 318/66, 254, 293, 494; 123/406.13
See application file for complete search history.

(56) References Cited

U.S. PATENT DOCUMENTS

| | | | | |
|---|---|---|---|---|
| 4,506,378 A | * | 3/1985 | Noso et al. ............ | 704/275 |
| 5,818,678 A | * | 10/1998 | Berg et al. ............. | 361/152 |
| 6,078,154 A | * | 6/2000 | Manlove et al. ........ | 318/293 |
| 6,262,546 B1 | * | 7/2001 | Draves et al. .......... | 318/293 |
| 6,732,708 B2 | * | 5/2004 | Nishizawa et al. ..... | 123/406.13 |
| 6,834,640 B2 | * | 12/2004 | Nishizawa et al. ..... | 123/406.13 |
| 2008/0143288 A1 | * | 6/2008 | Iwaji et al. ............ | 318/722 |
| 2009/0108789 A1 | * | 4/2009 | Bliley et al. ........... | 318/494 |

* cited by examiner

*Primary Examiner*—Paul Ip

(57) ABSTRACT

Methods and apparatus are provided for controlling first and second motors. A controller includes a processor supplying a control signal for driving the motors and a logic circuit coupled to the processor. The processor produces a first trigger coordinated with the rate of the first motor and a second trigger coordinated with the rate of the second motor. The logic circuit produces a third trigger from a combination of the first and second triggers. The processor includes a converter for sampling the currents of the motors in response to the third trigger. The processor further produces a modified pulse width in the first trigger if a period between the first and second triggers is less than a predetermined limit and directs the converter to consecutively sample the currents in response to the modified pulse width.

20 Claims, 2 Drawing Sheets

METHOD AND APPARATUS FOR CONTROLLING ASYNCHRONOUS MOTORS

TECHNICAL FIELD

The present invention generally relates to controlling motor drives, and more particularly relates to methods and apparatus for controlling multiple motor drives that are asynchronously operable.

BACKGROUND OF THE INVENTION

Some vehicles utilize multiple motors in the drive system. For example, a vehicle may have a separate electric motor driving each wheel or a combination of wheels (e.g., one electric motor driving a rear pair of wheels and another electric motor driving a front pair of wheels). One benefit of having multiple electric motors is to implement greater control or response of the vehicle to a variety of environments.

Each of the electric motors is typically controlled with a different processor or controller. Using a separate controller for each of the electric motors may seem convenient to implement. For example, each of the motors may be operated asynchronously (e.g., switching and sampling at different rates), and these rates may also be independently changing during operation. However, each controller contributes to the overall number of drive system components and generally increases the size, weight, and complexity thereof. An additional controller may be used to coordinate the controllers, and thereby control the electric motors, but will generally increase the number of vehicle components and further increase drive system size, weight, and complexity.

Accordingly, it is desirable to provide a controller or system with a reduced number of components for controlling multiple motors operating asynchronously. In addition, it is desirable to provide a method for controlling multiple motors operating asynchronously using a single processor. Furthermore, other desirable features and characteristics of the present invention will become apparent from the subsequent detailed description and the appended claims, taken in conjunction with the accompanying drawings and the foregoing technical field and background.

SUMMARY OF THE INVENTION

Apparatus and methods are provided for controlling multiple motors using a single processor. In one embodiment, a controller is provided for operating first and second motors. The first motor operates at a first rate and produces a first current, and the second motor operates at a second rate and produces a second current. The controller comprises a processor configured to supply a control signal for driving the first and second motors and further configured to produce first and second sampling triggers, and a logic circuit coupled to the processor and configured to produce the third sampling trigger from a logic OR of the first and second sampling triggers. The control signal is based on the first and second currents, the first sampling trigger is coordinated with the first rate, and the second sampling trigger is coordinated with the second rate. The processor comprises a converter configured to sample the first and second currents in response to a third sampling trigger. The processor is further configured to produce a modified pulse width in the first sampling trigger if a period between the first and second sampling triggers is less than a predetermined limit. The converter is further configured to consecutively sample the first and second currents in response to the modified pulse width.

In another embodiment, a method is provided for controlling first and second motors. The first motor operates at a first rate and produces a first current, and the second motor operates at a second rate and produces a second current. The method comprises producing a signal from a logic OR of first and second sampling triggers, producing a modified pulse width of the signal if a period between the first and second sampling triggers is less than a predetermined limit, consecutively sampling the first and second currents in response to the modified pulse width, and transmitting a control signal based on the first and second sampling triggers. The first sampling trigger is based on the first rate, and the second sampling trigger is based on the second rate. The control signal drives the first and second motors.

In another embodiment, a controller is provided for operating first and second motors. The first motor operates at a first rate and produces a first current, and the second motor operates at a second rate and produces a second current. The controller comprises a processor configured to supply a control signal for driving the first and second motors and further configured to produce first and second sampling triggers, and a logic circuit coupled to the processor. The control signal is based on the first and second currents, the first sampling trigger is coordinated with the first rate, and the second sampling trigger is coordinated with the second rate. The processor comprises a converter configured to sample the first and second currents in response to a third sampling trigger, a first predefined instruction set to produce an extended pulse width of the first sampling trigger if a period between the first and second sampling triggers is within a predetermined limit, and a second predefined instruction set to schedule a consecutive sampling of the first and second currents by the converter in response to the extended pulse width. The logic circuit is configured to produce the third sampling trigger from a logic OR of the first and second sampling triggers.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Method and apparatus are provided for controlling multiple motors that operate at asynchronous rates to one another. In one embodiment, a controller is provided to control two motors that may operate asynchronously to one another. The controller comprises a single processor having an analog-to-digital converter (ADC) and a logic circuit coupled to the processor. The processor produces two triggers that are each coordinated with the operation rate of a corresponding motor, and the logic circuit produces a third trigger from a combination of the two triggers produced by the processor. In response to the third trigger, the ADC samples the currents from the two motors. At times, the timing of the first and second triggers may occur in close proximity to one another. The processor determines if the first and second triggers are in close proximity to one another and modifies the pulse width of the first trigger such that the currents from the motors may be consecutively sampled by the converter in response to the modified pulse width. The processor also produces control signals (e.g., pulse width modulated (PWM) signals) to operate the motors using the first and second triggers as references, respectively.

Figure 1:
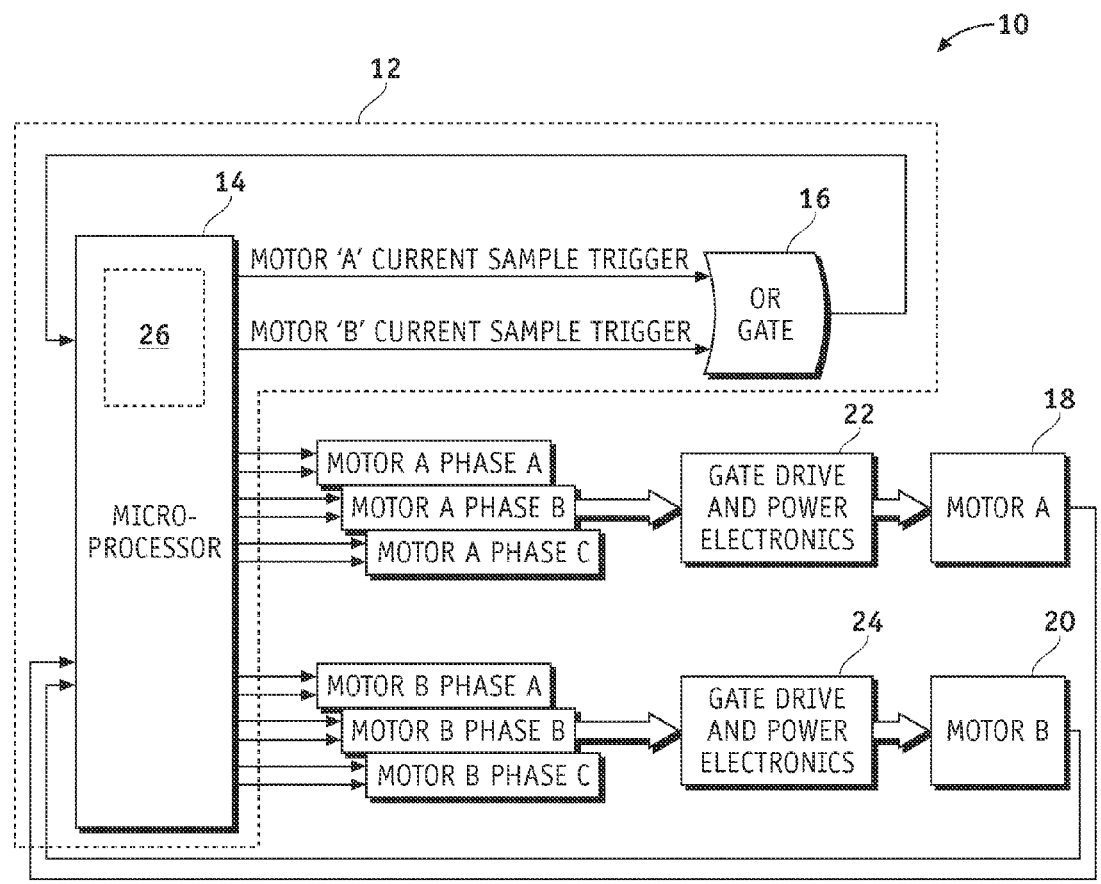
FIG. 1 is a block diagram of a drive system in accordance with an exemplary embodiment of the present invention.

Referring to the drawings, FIG. 1 is a block diagram of a drive system 10 in accordance with an exemplary embodiment. The drive system 10 comprises a controller 12 configured to produce control signals (e.g., Motor A Phase A, Motor A Phase B, Motor A Phase C, Motor B Phase A, Motor B Phase B, and Motor B Phase C), a logic OR circuit 16 having an input coupled to a first output of the controller 12 and having an output coupled to a first input of the controller 12, gate drive and power electronics 22, 24 each having an input coupled to a second output of the controller 12, and first and second motors 18, 20 (e.g., Motor A and Motor B) each coupled to an output of a corresponding one of the gate drive and power electronics 22, 24. The gate drive and power electronics 22, 24 supply AC current to the motors 18, 20 in response to the respective control signals from the controller 12. Currents from the motors 18, 20 are supplied to a second input of the controller 12 (e.g., as feedback) and sampled to produce the control signals. The sampling of both of these currents is based on the output of the logic OR circuit 16 and controlled by the controller 12.

In this embodiment, the controller 12 supplies a first control signal (e.g., Motor A Phase A, Motor A Phase B, and Motor A Phase C) to a first gate drive and power electronics 22 and a second control signal (e.g., Motor B Phase A, Motor B Phase B, and Motor B Phase C) to a second gate drive and power electronics 24. Although the controller 12 is configured to control two motors, the controller 12 may be reconfigured to control additional motors.

The gate drive and power electronics 22, 24 supply AC current to the motors 18, 20 in response to the respective control signals. Each of the gate drive and power electronics 22, 24 may include, but is not necessarily limited to, a voltage/power limiter, a field-weakening control, a current regulator, and an inverter (e.g., a voltage source inverter) to implement the supply of current to drive the motors 18, 20. Each of the motors 18, 20 is an electric motor, preferably a three-phase AC motor (e.g., a permanent magnet motor), and the motors 18, 20 operate in response to the supplied AC current. Synchronous permanent magnet motors (SPMM) typically have power density and efficiency characteristics that are well-suited for electric vehicle (EV)/fuel cell electric vehicle (FCEV)/hybrid electric vehicle (HEV) propulsion applications. These types of electric motors may be used for a variety of drive systems in vehicles or other applications.

AC current is applied to the motor phases (e.g., three phases) via a center-based PWM method. For each cycle of each of the motors 18, 20, the controller 12 performs three (3) current samples, three (3) control determinations, and produces three (3) PWM control signals. For example, the controller 12 produces a control signal (Motor A Phase A) for a first phase of Motor A, a control signal (Motor A Phase B) for a second phase of Motor A, a control signal (Motor A Phase C) for a third phase of Motor A, a control signal (Motor B Phase A) for a first phase of Motor B, a control signal (Motor B Phase B) for a second phase of Motor B, and a control signal (Motor B Phase C) for a third phase of Motor B. Each of these sequences is referred to as a "switching cycle," and typically occurs from about 2 KHz to about 20 KHz, although the switching cycle may vary beyond this frequency range.

One or more components of the controller 12 may be embodied in software or firmware, hardware, such as an application specific integrated circuit (ASIC), an electronic circuit, a processor and memory that execute one or more software or firmware programs, a combinational logic circuit, and/or other suitable components, or a combination thereof. In one embodiment, the controller 12 comprises a microprocessor 14 having an ADC 26, although other processing devices may be implemented in the controller 12 for other embodiments. The microprocessor 14 generates (e.g., via software) two sampling triggers (Motor A Current Sample Trigger and Motor B Current Sample Trigger), one for each of the motors 18, 20. Each of the sampling triggers corresponds to a sampling of the respective phase currents. For example, a first sampling trigger (Motor A Current Sample Trigger) corresponds to the sampling of the Motor A phase currents, and a second sampling trigger (Motor B Current Sample Trigger) corresponds to the sampling of the Motor B phase currents.

In this embodiment, the logic OR circuit 16 has first and second inputs for receiving the first and second sampling triggers (Motor A Current Sample Trigger and Motor B Current Sample Trigger) from the microprocessor 14. The logic OR circuit 16 produces a third sampling trigger representing the logic OR of the two sampling triggers. For example, the first and second sampling triggers may be coupled together (e.g., wired together) in an OR configuration. The third sampling trigger is returned to the microprocessor 14 to trigger the ADC 26.

Generally, the execution of motor control tasks is scheduled in coordination with the sampling of the phase currents. A timer/compare peripheral on the microprocessor 14, such as an Enhanced Modular Input/Output Subsystem (EMIOS), may be used to generate the two fundamental waveforms of the first and second sampling triggers (Motor A Current Sample Trigger and Motor B Current Sample Trigger). For example, control algorithms executed by the controller 12 may be paced by the waveforms of the sampling triggers to sample the motor currents. Each of the waveforms has a predetermined frequency that corresponds to an individual switching frequency associated with a respective motor 18, 20.

In an exemplary embodiment, during a power-up sequence of the drive system 10, the two switching frequencies are set to predetermined and substantially identical values that occur about one-hundred and eighty degrees (180°) out of phase from each other. During the course of initialization and system operation, these switching frequencies may independently change based on operating or performance characteristics of the drive system 10. For example, lower switching frequencies may be used at low motor speeds to limit silicon switch related power losses, and higher switching frequencies may be used at higher motor speeds to improve control stability.

The currents from the motors 18, 20 are supplied to the ADC 26. For each trigger interval of a sampling trigger, the ADC 26 samples the appropriate current (e.g., current from Motor A and/or current from Motor B). Upon completion of the analog-to-digital conversion, an interrupt is generated that signals the start of a software switching cycle. The output of this software switching cycle is the PWM control signal associated with each motor phase. When the sampling trigger associated with Motor A (Motor A Current Sample Trigger) is sufficiently spaced apart in time from the sampling signal associated with Motor B (Motor B Current Sample Trigger), each trigger and sampling interval for both Motor A and Motor B can occur without interference from the other.

The controller 12 monitors the timing of the first and second sampling triggers (Motor A Current Sample Trigger and Motor B Current Sample Trigger), and in some cases, these sampling triggers may produce a contentious condition. A "contentious condition" as used herein refers to a condition where a sampling interval associated with the sampling trigger of one motor may interfere with a sampling interval associated with the sampling trigger of the another motor. For example, a contentious condition is produced if a sampling interval associated with the first sampling trigger (Motor A Current Sample Trigger) is within a pre-determined time period of a sampling interval associated with the second sampling trigger (Motor B Current Sample Trigger). This time period may be based on a conversion time associated with the ADC 26 and/or an interrupt time associated with the software executed by the controller 12.

In a contentious condition, the controller 12 dynamically adjusts (e.g., via software) the sampling interval of the first sampling trigger such that the sampling interval of the third sampling trigger accommodates the sampling of both of the motor currents. For example, the pulse width associated with the corresponding sampling interval in the first sampling trigger is increased such that the logic OR of the first and second sampling triggers results in a single trigger pulse that is supplied to the ADC 26. The pulse width of the first sampling trigger associated with the contentious condition may be extended to overlap the pulse width of the second sampling trigger associated with the contentious condition. If the contentious condition no longer exists (e.g., as determined by the controller 12), the pulse width of the first sampling trigger is restored to a normal width (e.g., corresponding to the first sampling trigger supplied to the logic OR circuit 16).

The order of sampling during the contentious condition is pre-determined by the controller 12. For example, sampling of the motor currents is typically scheduled in a queue (not shown) of the ADC 26. During the contentious condition, the motors 18 and 20 are both scheduled in the ADC 26 queue for sampling with one trigger (e.g., the resulting sampling interval from the logic OR of the first and second sampling triggers). By monitoring the timing of the first and second sampling triggers, the controller 12 tracks the order of these sampling triggers, and thus trigger arbitration and scheduling can be prepared for subsequent switching cycles and contentious or non-contentious conditions. The controller 12 thus uses a single processor to operate the two motors 18, 20, which may operate at independent switching frequencies, without disruption to the control switching cycle. Additionally, the controller 12 can accommodate dynamic variations of the switching frequencies between the motors 18, 20.

Figure 2:
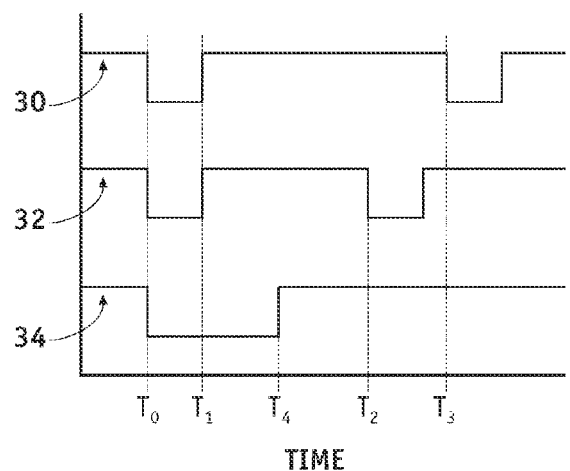
FIG. 2 is a graph of sampling trigger waveforms useful in understanding the controller shown in FIG. 1.

FIG. 2 is a graph of sampling trigger waveforms 30, 32, 34 useful in understanding the controller 12 shown in FIG. 1. Referring to FIGS. 1 and 2, the sampling trigger waveforms 30, 32, 34 illustrate different embodiments of the sampling trigger supplied to the ADC 26 (e.g., based on the output of the logic OR circuit 16). A first waveform 30 is shown for a single motor (e.g., Motor A), a second waveform 32 is shown for two motors (e.g., Motor A and Motor B) with distinct sampling triggers (e.g., non-contentious first and second sampling triggers), and a third waveform 34 is shown for two motors (e.g., Motor A and Motor B) with a single sampling trigger for a contentious condition.

The first waveform 30 has a first sampling trigger initiating at time $T_0$ for sampling current from Motor A and a second sampling trigger initiating at a time $T_3$ for sampling current from Motor A. The first sampling trigger has a pulse width extending from the time $T_0$ to a time $T_1$. The second waveform 32 has a first sampling trigger initiating at time $T_0$ for sampling current from Motor A and a second sampling trigger initiating at time $T_2$. In this embodiment, the two motors (Motor A and Motor B) are scheduled in the ADC 26 queue with distinct first and second sampling triggers.

The third waveform 34 has a single sampling trigger initiating at time $T_0$ and ending at a time $T_4$ for a contentious condition. In this embodiment, the two motors (Motor A and Motor B) are scheduled in the ADC 26 queue with a single sampling trigger. In this contentious condition, the pulse width of the first sampling trigger has been extended as a consequence of the logic OR of the first and second sampling triggers associated with the contentious condition. For example, the pulse width of the first sampling trigger in this contentious condition is extended to overlap the pulse width of the second sampling trigger in this contentious condition. In response to the single sampling trigger, the currents of both motors (Motor A and Motor B) are consecutively sampled. If there is no longer a contentious condition, the pulse width of the first sampling trigger is restored to the normal width.

Figure 3:
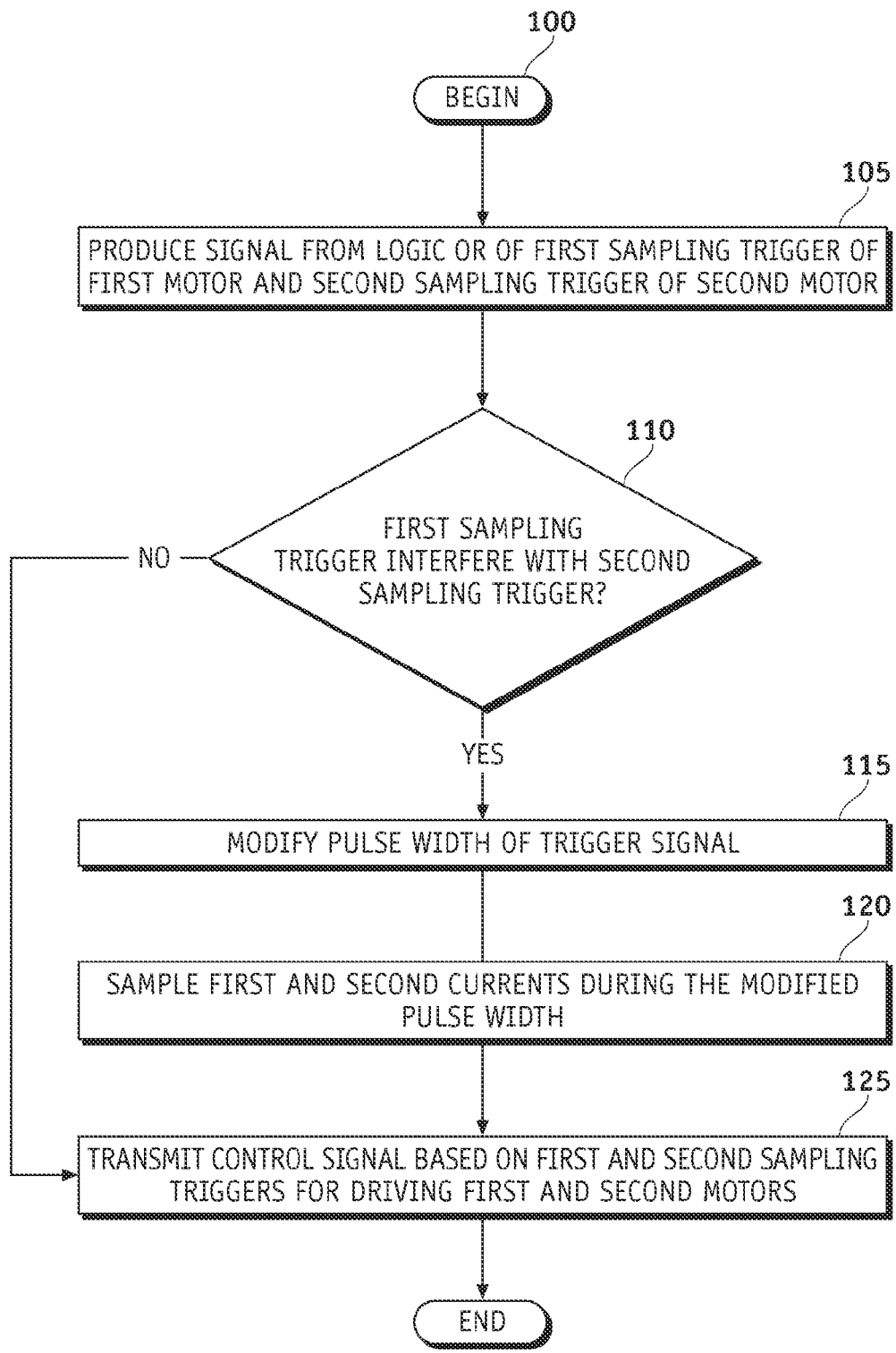
FIG. 3 is a flow diagram of a method for controlling first and second motors in accordance with an exemplary embodiment of the present invention.

FIG. 3 is a flow diagram of a method 100 for controlling first and second motors (e.g., Motor A and Motor B) in accordance with an exemplary embodiment of the present invention. Referring to FIGS. 1 and 3, each of the motors 18, 20 has an operation rate (e.g., Motor A operates at a first rate and Motor B operates at a second rate based on the switching frequencies of the respective motors 18, 20) which may be synchronous or asynchronous to one another. Additionally, each of the motors 18, 20 may be a three-phase AC motor. A signal is produced from a combination of first and second sampling triggers, as indicated at step 105. In one embodiment, the microprocessor 14 produces sampling triggers that are coordinated with the rates (e.g., switching frequencies) of the motors 18, 20. For example, the microprocessor 14 produces a first sampling trigger coordinated with the first rate of Motor A and a second sampling trigger coordinated with the second rate of Motor B. A third sampling trigger is produced from a combination of the first and second sampling triggers. In one embodiment, the first sampling trigger is combined with the second sampling trigger via a logic OR to produce the third sampling trigger. For example, the first and second sampling triggers are supplied by the microprocessor 14 to the logic OR circuit 16 to produce the third sampling trigger, and the third sampling trigger is supplied to the ADC 26.

A determination is made if the first sampling trigger will interfere with the second sampling trigger (e.g., in a contentious condition), as indicated at step 110. In one embodiment, a determination is made if the first sampling trigger is within a predetermined amount of time to the second sampling trigger. This amount of time may be based on a software interrupt processing time (e.g., associated with the software executed by the controller 12), a conversion time (e.g., associated with the ADC 26), or both. Other drive system criteria may be used to delineate if the first sampling trigger will interfere with the second sampling trigger. A modified pulse width of the signal is produced if the first sampling trigger will interfere with the second sampling trigger, as indicated at step 115. For example, the pulse width of the first sampling trigger is extended (e.g., by the controller 12) if the timing of the first and second sampling triggers produces a contentious condition.

The first and second currents are sampled in response to the modified pulse width, as indicated at step 120. For example, the logic OR of the first sampling trigger, associated with the contentious condition and having the extended pulse width, and the second sampling trigger, associated with the contentious condition, results in a single trigger pulse (e.g., in the third sampling trigger). This single trigger pulse is supplied to the ADC 26, and the ADC 26 samples the current from Motor A (e.g., converts the sampled current from Motor A to a digital value) and samples the current from Motor B. With a three-phase AC motor embodiment for the motors 18, 20, the ADC 26 samples the current for each of the phases in response to the third sampling trigger. In one embodiment, a sampling sequence of the currents from Motor A and Motor B is determined based on the timing of the respective sampling triggers, and the motor currents are sampled during the modified pulse width in the order of the sampling sequence.

A control signal is transmitted based on the first and second sampling triggers, as indicated at step 125. If the first sampling trigger will not interfere with the second sampling trigger (e.g., a non-contentious condition), the control signal is transmitted as indicated at step 125. For example, a first control signal is produced by the microprocessor 14, based on the sampled current from Motor A, and supplied to the drive and power electronics 22 to drive Motor A. A second control signal is produced by the microprocessor 14, based on the sampled current from Motor B, and supplied to the drive and power electronics 24 to drive Motor B. In one embodiment, the control signals are pulse width modulated (PWM) signals for driving the motors 18, 20.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A controller for operating first and second motors, the first motor operating at a first rate and producing a first current, the second motor operating at a second rate and producing a second current, the controller comprising:
   a processor configured to supply a control signal for driving the first and second motors and further configured to produce first and second sampling triggers, the control signal based on the first and second currents, the first sampling trigger coordinated with the first rate, the second sampling trigger coordinated with the second rate, the processor comprising a converter configured to sample the first and second currents in response to a third sampling trigger; and
   a logic circuit coupled to the processor and configured to produce the third sampling trigger from a logic OR of the first and second sampling triggers, the processor further configured to produce a modified pulse width in the first sampling trigger if a period between the first and second sampling triggers is less than a predetermined limit, the converter further configured to consecutively sample the first and second currents in response to the modified pulse width.

2. A controller according to claim 1, wherein the processor has first and second inputs and first and second outputs, the first input of the processor configured to receive the first and second currents, the processor further configured to:
   produce the first and second sampling triggers at the first output of the processor; and
   produce first and second control signals at the second output of the processor, the first control signal for driving the first motor, the second control signal for driving the second motor; and
   wherein the logic circuit has an input coupled to the first output of the processor and has an output coupled to the second input of the processor.

3. A controller according to claim 1, wherein the converter is further configured to consecutively sample the first and second currents in response to the modified pulse width.

4. A controller according to claim 3, wherein the processor is further configured to determine a sampling sequence of the first and second currents based on the first and second sampling triggers; and
   wherein the converter is further configured to consecutively sample the first and second currents in response to the modified pulse width based on the sampling sequence.

5. A controller according to claim 1, wherein the converter has a conversion time; and wherein the processor has an interrupt processing time and is further configured to determine if a contention exists between the first and second sampling triggers based on at least one of the conversion time and the interrupt processing time.

6. A controller according to claim 1, wherein the first and second motors are each three-phase alternating current motors; and wherein the processor is further configured to:
   produce a first control signal for each phase of the first motor, the first control signal based on the first current; and
   produce a second control signal for each phase of the second motor, the second control signal based on the second current.

7. A controller according to claim 6, wherein the first and second control signals are each pulse width modulated (PWM) signals, and wherein the processor is further configured to:
   produce the first control signal using the first sampling trigger as a first reference; and
   produce the second control signal using the second sampling trigger as a second reference.

8. A method for controlling first and second motors, the first motor operating at a first rate and producing a first current, the second motor operating at a second rate and producing a second current, the method comprising:
   producing first and second sampling triggers, the first sampling trigger based on the first rate, the second sampling trigger based on the second rate;
   modifying a pulse width of the first sampling trigger if the first sampling trigger will interfere with the second sampling trigger;
   producing a first signal from a logic OR of the first and second sampling triggers;
   sampling the first and second currents in response to the first signal; and
   transmitting a second signal based on the first and second sampling triggers, the second signal driving the first and second motors.

9. A method according to claim 8, wherein the step of modifying a pulse width comprises determining if a period between the first and second sampling triggers is less than a predetermined limit, the predetermined limit based on at least one of a software interrupt processing time and a conversion time.

10. A method according to claim 8, wherein the step of sampling the first and second currents comprises:
   determining a sampling sequence of the first and second currents based on the first and second sampling triggers; and
   consecutively sampling the first and second currents in the sampling sequence in response to the first signal.

11. A method according to claim 8, wherein each of the first and second motors is an alternating current (AC) motor having three phases; and wherein the step of sampling the first and second currents comprises sampling the first and second currents for each of the three phases of the AC motor in response to the first signal.

12. A method according to claim 8, wherein the step of transmitting a second signal comprises:
   producing a first control signal, the first control signal driving the first motor; and
   producing a second control signal, the second control signal driving the second motor.

13. A method according to claim 12, wherein the step of modifying a pulse width comprises, prior to the step of producing a first signal, producing an extended pulse width of the first sampling trigger if the first sampling trigger will interfere with the second sampling trigger.

14. A method according to claim 8, wherein the step of sampling the first and second currents comprises converting each of the first and second currents to a digital value.

15. A method according to claim 8, wherein the step of producing a first signal comprises combining the first sampling trigger with the second sampling trigger via a logic OR to produce the first signal.

16. A controller for operating first and second motors, the first motor operating at a first rate and producing a first current, the second motor operating at a second rate and producing a second current, the controller comprising:
   a processor configured to supply a control signal for driving the first and second motors and further configured to produce first and second sampling triggers, the control signal based on the first and second currents, the first sampling trigger coordinated with the first rate, the second sampling trigger coordinated with the second rate, the processor comprising:
      a converter configured to sample the first and second currents in response to a third sampling trigger;
      a first predefined instruction set to produce an extended pulse width of the first sampling trigger if a period between the first and second sampling triggers is within a predetermined limit; and
      a second predefined instruction set to schedule a consecutive sampling of the first and second currents by the converter in response to the extended pulse width; and
   a logic circuit coupled to the processor, the logic circuit configured to produce the third sampling trigger from a logic OR of the first and second sampling triggers.

17. A controller according to claim 16, wherein the converter is an analog-to-digital converter.

18. A controller according to claim 16, wherein the processor comprises a third predefined instruction set to determine a sampling sequence of the first and second currents in response to the extended pulse width.

19. A controller according to claim 18, wherein the processor has a software interrupt processing time; wherein the converter has a conversion time; and wherein the third predefined instruction set is configured to access at least one of the conversion time and the software interrupt processing time to determine the sampling sequence.

20. A controller according to claim 16, wherein the processor has an input and an output, the processor further configured to produce the first and second sampling triggers at the output of the processor; and
   wherein the logic circuit has a first input configured to receive the first sampling trigger, a second input configured to receive the second sampling trigger, and an output coupled to the input of the processor.

* * * * *